May 14, 1935.  W. K. DODGE  2,001,242

DEMOUNTABLE WHEEL

Filed June 20, 1932   2 Sheets-Sheet 1

INVENTOR.
WILL K. DODGE
BY
ATTORNEYS.

May 14, 1935.  W. K. DODGE  2,001,242
DEMOUNTABLE WHEEL
Filed June 20, 1932   2 Sheets-Sheet 2
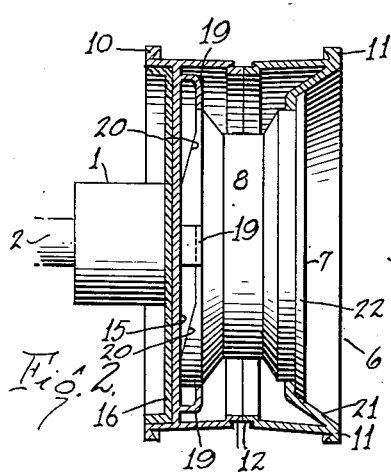
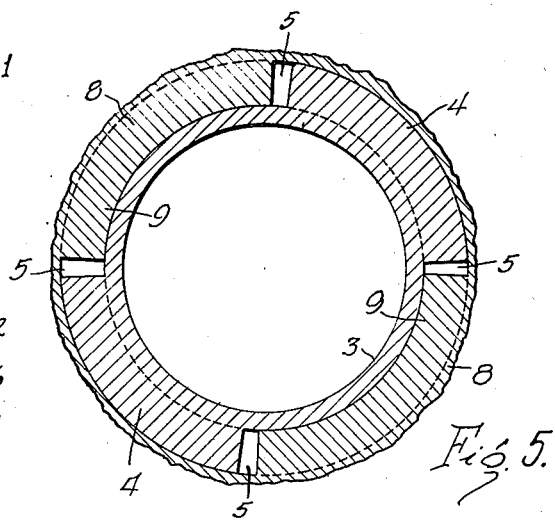
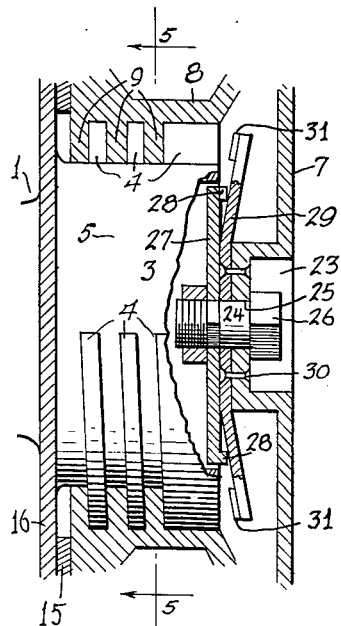
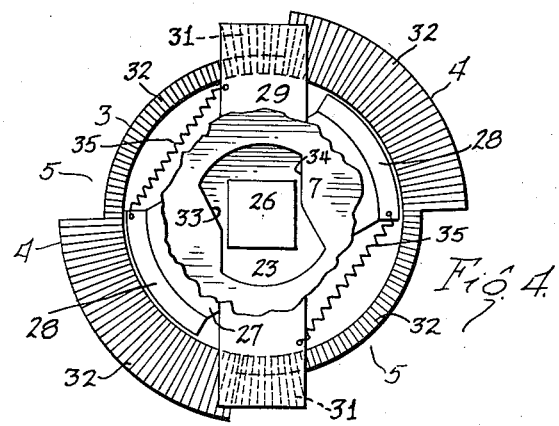
INVENTOR.
WILL K. DODGE
BY
ATTORNEYS.

Patented May 14, 1935

2,001,242

UNITED STATES PATENT OFFICE 2,001,242

DEMOUNTABLE WHEEL

Will K. Dodge, Upper Lake, Calif.

Application June 20, 1932, Serial No. 618,394

4 Claims. (Cl. 301—9)

My invention relates to improvements in demountable wheels, and it consists of the combinations, constructions and arrangements hereinafter described and claimed.

An object of my invention is to provide a demountable wheel for automobiles and the like in which the turning of one nut will first release the locking mechanism and a further turning of the same nut will free the demountable portion of the wheel from the hub. The demountable portion and the hub make use of cooperating mutilated or segmental threads, and this permits the demountable portion to be rotated through a small arc with respect to the hub and this movement will free the threads on the demountable wheel portion from those on the hub and then the demountable portion may be withdrawn from the hub by an axial movement.

A further feature of the invention lies in the fact that the same mechanism that is used for securing the demountable portion to the hub is also used in securing the rim sections together. After the demountable wheel portion has been removed, the means can be actuated for freeing the rim sections. The rim is split annularly, and when the two sections are freed, they can be readily removed from the tire without the necessity of first collapsing the rim, as is now the practice.

Other objects and advantages will appear in the following specification, and the novel features of the device will be particularly pointed out in the appended claims.

My invention is illustrated in the accompanying drawings forming a part of this application, in which Figure 1 is a vertical section through the entire device;

Figure 2 is a view similar to Figure 1 on a smaller scale and shows some of the parts in elevation;

Figure 3 is a view similar to Figure 2, but on a larger scale and shows certain parts in elevation;

Figure 4 is a front view of the device portions being broken away; and

Figure 5 is a section along the line 5—5 of Figure 3 and shows the wheel and hub portions in a position for removal of the wheel from the hub.

Figure 1:
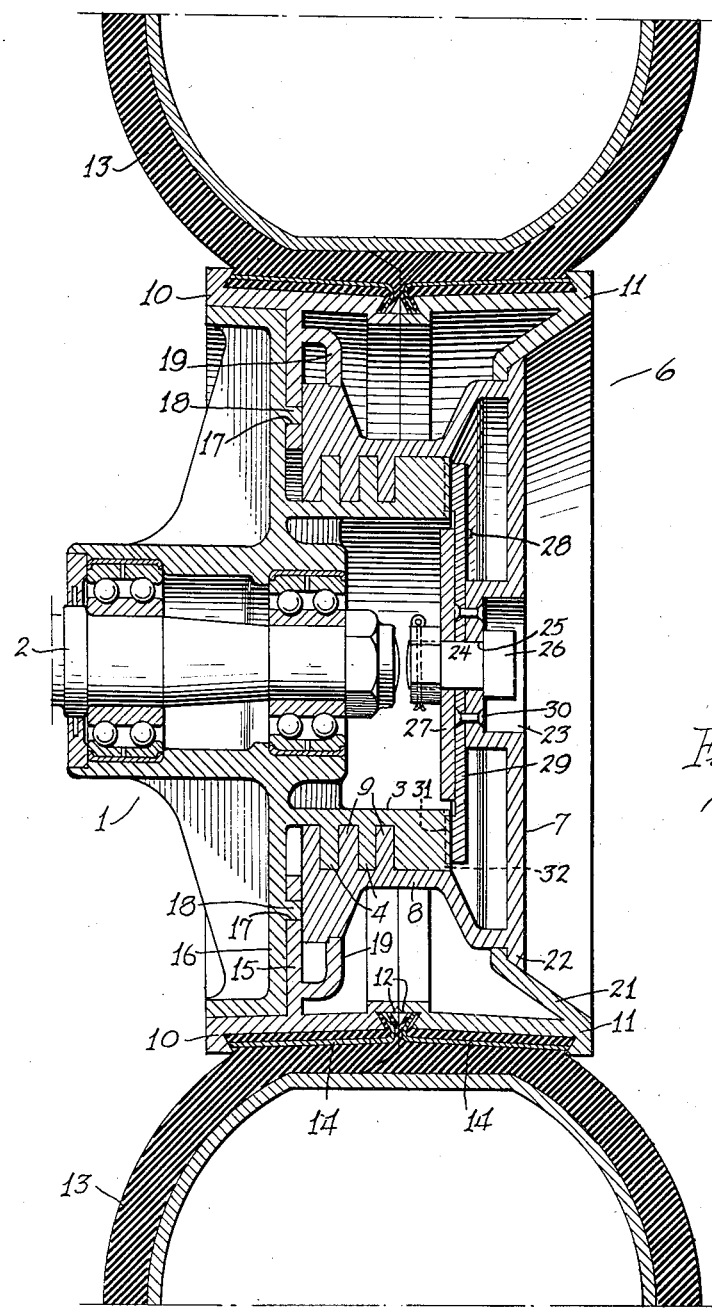

In carrying out my invention, I provide a hub, indicated generally at 1, and this hub may form the mechanism for the front wheel of an automobile or the rear wheel. If the device is used on the non-driving wheel, the hub will idle on an axle 2, as shown. If the device is used on the driving wheel, whether front or rear, the hub will be keyed to the axle so as to be rotated thereby.

The hub 1 has a cylindrical portion 3 which is provided with segmental threads 4 on its outer surface. Figure 3 shows how the segmental threads are inclined and how a space 5 is provided between the segmental portions.

A demountable wheel portion, indicated generally at 6, is provided with a hub cap boxing 7. The boxing has a cylindrical portion 8 which is provided with inwardly-extending threads 9. The threads 9 are segmental so as to cooperate with the threads 4 and be quick acting. When the hub cap boxing is secured to the hub 1, the threads 9 are first aligned with the spaces 5 and then the boxing 7 is moved axially until the threads 4 and 9 are in proper position, whereupon a rotational movement will cause the threads to mesh.

The boxing 7 removably carries two rim sections 10 and 11.

The sections have annular grooves 12 adjacent to their abutting surfaces and these grooves form a dove-tailed groove for receiving a portion of a tire casing 13. If desired, the tire can be reinforced by rods or bands 14.

The rim section 10 has a flange 15, and this flange is designed to abut against a wheel support 16, which forms a part of the hub structure 1. The flange 15 has openings 17 for receiving projections 18, carried by the wheel support 16. When the projections 18 are received in the openings 17, the rim section 10 will be secured to the wheel so as to rotate therewith. These projections are necessary, especially when the hub 1 constitutes the driving member.

The rim section 10 also has L-shaped fingers 19 that are designed to be received by inclined planes 20, (see Figure 2), disposed on the outer surface of the hub cap boxing 7. The rim section 11 has an inwardly-extending flange 21, and this flange is designed to bear against a flange 22, carried by the hub cap boxing 7. It will be noted from this construction that when the hub cap 7 is rotated in one direction with respect to the rim sections 10 and 11, the fingers 19 will engage with the cam surfaces 20 and will draw the rim sections together. The demountable wheel portion is now placed on the hub, and the hub cap can be turned for causing the threads 4 and 9 to mesh. The hub cap 7 must be rotated with respect to the hub 1 in order to lock the hub cap to the hub. The threads 4 and 9 are inclined at a different angle to the inclined cams 20, and, therefore, a tightening of the hub cap on the hub will free the fingers 19 from the cam surfaces 20. However, the rim sections are still held together because the flange 15 is bearing against the portion 16, which is integral with the cylinder 3 and the threads 4.

The means for rotating and locking the hub cap 7 will now be described. In Figures 1, 3 and 4, I show the hub cap 7 as having a recess 23. This recess is preferably of the shape shown in Figure 4. A bolt 24 is mounted in an opening 25 in the hub cap 7, and the head 26 of the bolt is received in the recess 23. The bolt is connected to a cam 27, and this cam has inclined portions 28 for bearing against a pawl 29. The pawl is rigidly secured to the boxing 7 by rivets 30. The pawl has teeth 31 that normally engage with teeth 32 on the end of the cylinder 3. The teeth are inclined so that the pawl 29 can be rotated in a clockwise direction, but prevent the pawl from rotating in a counterclockwise direction. It will be seen that the pawl will be moved with the hub cap boxing 7 so that when the boxing is secured in locked position, the pawl will engage with the ratchet teeth 32 and will prevent return movement.

The means for freeing the pawl from the ratchet comprises the bolt 24 and the cam 27. When freeing the wheel from the hub, the head 26 of the bolt is turned in a counterclockwise direction when looking at Figure 4. This movement will swing with the bolt the cam 27, and the cam portions 28 will engage with the ends of the pawl 29 and will swing the ends free of the ratchet teeth in the manner shown in Figure 3. When the pawl is freed from the ratchet teeth, the bolt head 26 is contacting with the surfaces 33 of the recess 23. A further movement of the bolt 26 in a counterclockwise direction will cause the hub cap box 7 to rotate with respect to the hub 1 and this will free the threads 9 from the threads 4. The threads 9 will be positioned in the passages 5 when the demountable portion is ready to be removed axially from the hub 1.

It will be noted that a freeing movement of the hub cap from the hub will cause the cap to engage with the fingers 19 by means of the inclined cam surfaces 20 and in this way, the rim sections are secured together and are removed with the hub cap. Subsequently, the rim sections can be freed from each other by rotating the hub cap so as to release the fingers 19.

When mounting the demountable wheel portion in place, the threads 9 are registered with the passage 5 and then the portion is moved axially into position. This will cause the projections 18 to enter the openings 17. The bolt 24 is now rotated and its initial movement will free the cam 27 from the pawl 29 and permit the ends of the pawl to return to normal position, where they will engage with the ratchet teeth 32. A further movement of the bolt head 26 in a clockwise direction will cause the head to engage with the surfaces 34 of the recess 23 and to rotate the hub cap boxing 7 with respect to the cylinder 3. This will cause the threads 4 and 9 to mesh and to lock the demountable wheel portion to the hub. As already stated, the pawl 29 prevents return movement. Springs 35 are used for preventing the cam 27 from accidentally moving beneath the pawl 29.

The device can be used for holding an airplane propeller in place. The hub 1 in this instance would constitute the propeller shaft and the propeller would take the place of the flange 15. The hub cap boxing 7 would constitute the nut for holding the propeller in place and the pawl 29 and cam 27 would be used in the same manner for locking the nut against turning.

While I have shown only the preferred form of my invention, it should be understood that various changes or modifications may be made within the scope of the appended claims without departing from the spirit of the invention.

I claim:

1. A demountable wheel comprising a hub having segmental threads, a demountable wheel portion having segmental threads for meshing with the first named threads when rotated with respect thereto, ratchet teeth on the hub, a pawl carried by the demountable portion and engaging with the teeth when the portion is rotated for securing the wheel from return movement, a cam rockably carried by the portion for freeing the pawl from the ratchet teeth, and means for rocking the cam and rotating the demountable wheel portion, the initial moving of the means rocking the cam and freeing the pawl, and a further movement of the means in the same direction rotating the demountable wheel portion and freeing the threads for permitting the removal of the demountable wheel portion from the hub.

2. A demountable wheel comprising a hub having segmental threads inclined in one direction, a demountable member having segmental threads for meshing with the first named threads when the member is rotated with respect to the hub, a rim split annularly for forming an inboard and an outboard rim half, both halves normally being carried by the demountable member, a flange on the member for engaging with the outboard rim half, fingers integral with the inboard rim half and normally engaging with the demountable member, cooperating means for locking the inboard rim half to the hub for preventing rotation between the two, said member having finger engaging cam surfaces inclined oppositely to the threads for freeing the fingers when the member is rotated in locking it to the hub, said hub having a support engaging with the inboard rim portion.

3. A demountable wheel comprising a hub having segmental threads, a demountable portion having segmental threads for meshing with the first named threads when the portion is first moved axially along the hub and then is rotated with respect thereto, said hub having an annular row of ratchet teeth thereon, a pawl carried by said portion and being movable over the teeth when the portion is rotated into locked position, said pawl engaging with said teeth and preventing return movement, a cam rockably carried by said portion and being movable with respect to said pawl for disengaging the pawl from the teeth, and rotating means for first causing the cam to disengage the pawl and then upon further continuous movement in the same direction rotating the portion to free its threads from the hub threads.

4. In a demountable wheel, a segmentally threaded hub having a face plate, a segmentally threaded and demountable portion rotatable with respect to the hub for causing the threads to mesh with the hub threads, a two piece rim circumferentially divided, said portion having a flange for bearing against one rim piece, fingers carried by the other rim piece, said portion having cam surfaces engaged by the fingers and inclined oppositely to the threads on said portion, means holding the finger carrying rim from rotating with respect to the plate, said portion when rotated into locked position freeing the fingers from the cams, whereby the rim pieces are held in abutting relation by the flange and plate, and means for locking the portion from rotating into a freed position with respect to the hub.

WILL K. DODGE.